Nov. 26, 1940.　　　A. B. NEWTON　　　2,222,628
EFFECTIVE TEMPERATURE CONTROL
Filed March 31, 1938　　　3 Sheets-Sheet 1

Fig. 1

Inventor
Alwin B. Newton
By George H Fisher
Attorney

Nov. 26, 1940.  A. B. NEWTON  2,222,628
EFFECTIVE TEMPERATURE CONTROL
Filed March 31, 1938  3 Sheets-Sheet 2

Fig. 2

Inventor
Alwin B. Newton
By George H Fisher
Attorney

Fig. 3

Patented Nov. 26, 1940

2,222,628

UNITED STATES PATENT OFFICE 2,222,628

EFFECTIVE TEMPERATURE CONTROL

Alwin B. Newton, Minneapolis, Minn., assignor to Minneapolis-Honeywell Regulator Company, Minneapolis, Minn., a corporation of Delaware Application March 31, 1938, Serial No. 199,217

15 Claims. (Cl. 257—3)

This invention relates to an effective temperature control system by means of which a space may be maintained at a comfortable temperature regardless of the humidity existing therein. It is well known that the temperature of a space may be maintained at a lower temperature when the relative humidity in the space is high than is necessary when the relative humidity is low, and still maintain the same degree of comfort in the space. In other words, with a high relative humidity in the space a temperature of 68° may provide comfort to the occupants, whereas, when the humidity becomes low, a temperature of 74° may become necessary to provide the same degree of comfort.

One of the features of my invention resides in the utilization of a humidity responsive device as the primary control of the heating and cooling apparatus in combination with a temperature responsive means for varying the control point of the humidity responsive means so as to maintain a substantially uniform effective temperature in the space being controlled. An advantage in using a humidity responsive device as the primary control of the heating and cooling apparatus resides in the fact that the humidity throughout all portions of the space is substantially the same whereas the temperature may vary considerably in the different parts of the space. It may therefore be possible to secure better control over the space where the primary control function is exercised by a humidity responsive element than by a temperature responsive element. By varying the control point of the humidity responsive element in accordance with the temperature of the space and in accordance with the teachings of my invention, the conditions in the space may be very effectively controlled.

One of the objects of my invention is therefore the provision of an improved year around control means for controlling heating and cooling apparatus for a building at all times without the necessity of any manual attention.

A further object of the invention is the provision of an improved year around control system for heating and cooling apparatus for a building wherein provision is made to compensate for the inherent lag of the heating and cooling apparatus and for the responsiveness of the control device therefor.

A further object of my invention is the provision of a control system for heating and cooling apparatus, the main control being affected by a humidity responsive device, the effectiveness of this device being varied in accordance with the temperature in the space, whereupon a uniform effective temperature in the space is maintained regardless of varying relative humidity therein.

Other objects of the invention will appear upon a study of the specification, claims, and appended drawings wherein like reference characters represent like parts in the various views, and wherein

Figure 1:
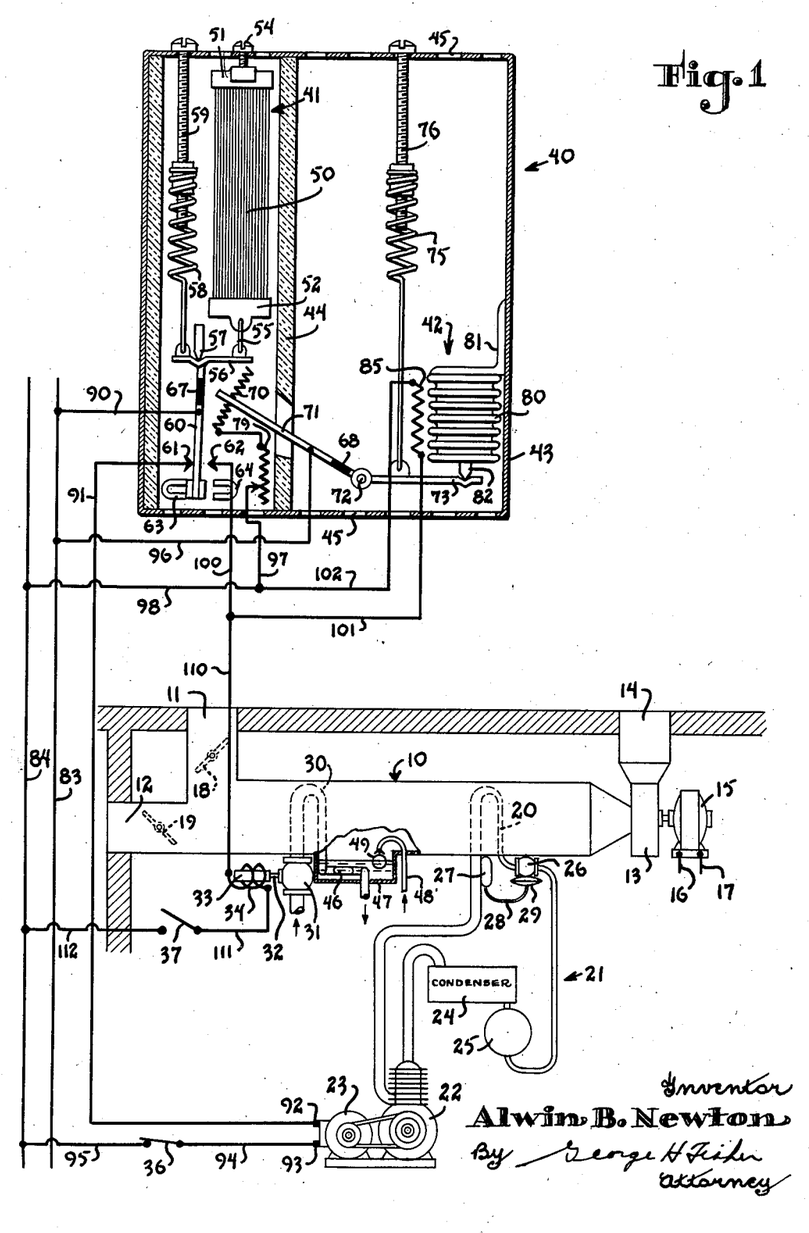
Figure 1 is a view of one form of system embodying my invention.

Referring more particularly to Figure 1 an air conditioning chamber is represented by the reference character 10 and includes a return air inlet 11, a fresh air inlet 12, a fan 13, and an outlet 14. A motor 15 is provided for driving the fan 13 and is provided with terminals 16 and 17 which may be connected to a suitable source of power. Dampers 18 and 19 are located in the return and fresh air inlets, respectively, for proportioning the amounts of fresh and return air that are circulated through the chamber 10. These dampers may be manually controlled or automatically controlled as desired.

A cooling coil 20 is located within the chamber 10, and this coil may comprise the evaporator of a conventional refrigerating system 21. This refrigerating system may include in addition to the evaporator 20, a compressor 22 driven by a motor 23, a condenser 24, a receiver 25, and an expansion valve 26. This expansion valve may be controlled in any well known manner as by a bulb 27 mounted in intimate contact with the outlet of evaporator 20 and connected by a capillary tube 28 to an operating bellows or diaphragm 29 of the valve 26. The operation of such a refrigeration system is well known and briefly includes the compressing of a refrigerant, subsequent condensing thereof in the condenser 24, from which it passes to the receiver 25 and thence through the expansion valve 26 into the evaporator 20 where it picks up heat from the surrounding air causing cooling thereof and gasifies, thence returning to the compressor 22.

Also mounted within the chamber 10 is a heating coil 30 which coil may be heated in any suitable manner as for example by passing steam therethrough, the flow of which may be controlled by a valve 31, which valve includes a stem 32 connected to an armature 33 which is enclosed by a solenoid 34. Energization of solenoid 34 acts on the armature 33 to open the valve 31, and upon deenergization of the solenoid 34 the valve 31 moves to closed position upon the influence of a suitable biasing means, not shown. Switches 36 and 37 may be provided to control the operation of the compressor motor 23 and the valve 31 whereby only one of these devices may be operated at a time, if desired. In other words, during the heating season, operation of the refrigerating system may not be desired whereupon switch 36 may be open, and switch 37 closed, whereas in the cooling season the position of the switch may be reversed so that the refrigeration system is operative but the valve 31 in control of the heating coil 30 is rendered inoperative. It should be noted however, that both of these switches may be closed at the same time whereupon either system may be permitted to operate, the operation thereof being determined by the conditions in the space being controlled at any particular time.

The outlet of the heating coil 30 may terminate in a coil 46 mounted in a pan humidifier 47, the flow of water to this humidifier through a pipe 48 being controlled by the float 49, or any other suitable means may be provided for controlling the flow of water to the pan 47. The steam or heating fluid leaving the heating coil 30 causes the water in the pan 47 to become rapidly vaporized whereby the air being heated is at the same time being humidified. It will, therefore, be seen that the humidifier is controlled in the same manner as the heating coil, there being no substantial amount of humidification except when steam is being supplied to coil 30.

For controlling the operation of the compressor and the steam valve, a controller generally represented by the reference character 40, is provided. This controller includes a humidity responsive element 41 and a temperature responsive element 42. These elements are located in a casing 43 and separated by a wall 44 which may be formed of a suitable heat insulating material. Casing 43 is provided with apertures 45 in the top and bottom as illustrated. The humidity responsive element may be of any desirable construction, as for example, hygroscopic hairs 50 connected at their ends to members 51 and 52. Member 51 may be connected to the casing 43 as by an adjusting screw 54 and member 52 is connected by means of a link 55 to lever 56. Lever 56 is pivoted intermediate its ends about a knife edge 57 and the end thereof opposite the link 55 is connected to a tension spring 58 which is in turn adjustably connected to the upper wall of casing 43 by means of an adjusting screw 59. Lever 56 carries a switch arm 60 which is designed to cooperate with contacts 61 and 62. An electrical insulating member 67 may be interposed between the lower end of arm 60 and lever 56. It will be apparent that as the humidity decreases, hair elements 50 will contract causing lever 56 to rotate in a counterclockwise direction about pivot 57 whereupon the switch arm 60 will be caused to move to the right or towards contact 62. In order that arm 60 may have a snap action between the contacts 61 and 62, magnets 63 and 64 may be provided. When sufficient tension has been imparted to the arm 60 by the humidity responsive element 50 to move the arm 60 away from magnet 63, it will be quickly attracted to the contact 62 by the magnet 64. Thus by the use of these magnets, the arm 60 may at all times be in engagement with either contact 61 or 62, or if desired, the magnets 63 and 64 may be spaced far enough apart so that when the arm 60 snaps away from contact 61 it will not snap into engagement with contact 62 until it has moved through a predetermined distance. In other words there may be a rest period between the contacts 61 and 62 within which the arm 60 is attracted equally by the magnets 63 and 64.

Mounted below the humidity responsive element is a heater 70 which is connected to a suitable source of power as will be hereinafter described, said heater being controlled by an arm 71, the position of which with respect to the heater 70 determines the heating effect thereof. A limiting resistance 79 may be provided in series with the resistance 70 to prevent a short-circuit when the arm 71 moves to the lower portion of the resistance 70. This resistance may be adjustable so that the heating effect of the heater for a given position of the arm 71 may be varied. This arm 71 forms one arm of a lever pivoted at 72, the other arm of which is designated by the reference character 73, the arms being electrically insulated from one another by insulation 68. This lever may be biased in a counter-clockwise direction by means of a tension spring 75 which is adjustably connected by means of adjusting screw 76 to the top of casing 43. Movement of this lever in a clockwise direction is imparted thereto by means of the temperature responsive device 42. While this temperature responsive device may be of any suitable construction, it is illustrated as being in the form of an expansible bellows 80 connected by means of a bracket 81 to a side wall of the casing 43. This bellows 80 is filled with an expansible fluid which, upon a rise in temperature, expands thus causing an expansion of the bellows 80. A pin 82 is provided on the bottom of the bellows 80 and cooperates with arm 73 to urge the lever to move in a clockwise direction upon a rise in temperature affecting the bellows 80, thus moving arm 71 upwardly over the heater 70. Upon a drop in temperature affecting the bellows 80 the lever will be moved in a counter-clockwise direction by the spring 75, thus moving arm 71 in the opposite direction. Mounted in heat exchange relationship with the bellows 80 is an electrical heating element 85, the purpose of which will be hereinafter described.

Line wires 83 and 84 may be connected to a suitable source of power (not shown), these wires conveying power to the various elements as will be set forth in the description of the operation.

*Operation of Figure 1*

In the operation of the system, if switch 36 is closed and switch 37 is open, as illustrated, the cooling system 21 is under the control of the controller 40 whereas the heating coil 30 and valve 31 are out of operation as long as switch 37 is allowed to remain open. With the parts of the controller in the position illustrated, arm 60 is in engagement with contact 61, thus indicating a high humidity in the space. Engagement of arm 60 with contact 61 causes the operation of compressor motor 23 through the following circuit: from line 83, conductor 90, arm 60, contact 61, conductor 91, contact 92 of motor 23 through the motor to contact 93, conductor 94, switch 36 and conductor 95 to the line 84. Operation of motor 23 causes the air within chamber 10 to be cooled and dehumidified, this cooled air being circulated throughout the space being cooled by the fan 13, whereupon a reduction in temperature in said space is effected.

Heater 70 is energized at all times through the following circuit: from line 83 through conductor 96, arm 71 through the heaters 70 and 79 and conductors 97 and 98 to the line 84. This generation of heat by the heater 70 raises the temperature of the air surrounding the humidity responsive element 50 thus reducing the relative humidity of said air. The provision of apertures 45 in the top and bottom of the compartment on closing the humidity responsive element 50, and the location of the heater 70 below the element 50 causes a circulation of air from the space through the apertures in the bottom wall of casing 43 over the heater 70, humidity responsive element 50 and back through the apertures 45 in the top wall of casing 43 to the space being controlled, by reason of the tendency of the heated air from heater 70 to rise. The humidity of the air affecting member 50 is controlled by the humidity in the space being cooled or heated as the case may be, and by the amount of heat generated by heater 70 so that the humidity of the air surrounding humidity element 50 will be different from the humidity of the air in the space being controlled, the amount of this difference being dependent upon the heater 70 and which is in turn controlled by the position of arm 71 thereon.

As the temperature of the air in the space begins to drop by reason of the operation of the cooling system, bellows 80 will begin to contract, causing downward movement of arm 71 over the heater 70 thus cutting some of the resistance out of the circuit through said heater and increasing the heating effect thereof. The increased heating effect of heater 70 causes the humidity of the air passing over element 50 to decrease and after the humidity has decreased to a sufficient value, arm 60 will be moved into engagement with contact 62. Moving of arm 60 out of engagement with contact 61 interrupts operation of compressor motor 23. Engagement of arm 60 with contact 62 causes a flow of current through the heater 85 by means of the following circuit: from line 83 through conductor 90, arm 60, contact 62, conductors 100, 101, heater 85 and conductors 102 and 98 to the line 84. Energization of heater 85 causes a gradual expansion of the bellows 80 whereupon the arm 71 gradually moves upwardly over the heater 70 and the heating effect thereof begins to decrease. By reason of the fact that the cooling system is not operating, the temperature of the space being controlled will gradually rise, it being assumed that the outdoor temperature is high enough to cause this effect and expansion of bellows 80 will take place by reason of the combined effects of heater 85 and the increase in the space temperature. The result of this will be to move arm 71 upwardly over heater 70, thus decreasing the heating effect thereof and lowering the temperature and therefore raising the humidity of the air affecting element 50. After this humidity has risen to the predetermined value, arm 60 will again be moved into engagement with contact 61 and the cooling system will again be started. It will now be noted that heater 85 is deenergized and starts to cool off, the effect of this being to cause the bellows 80 to cool somewhat faster than the actual drop in the space temperature which in turn will cause the heater 70 to heat up faster than it would if bellows 80 were influenced only by the space temperature and therefore the cooling system will be caused to shut down somewhat sooner than were heater element 85 not present. This heater 85 is provided to cause a shut-down of the system slightly in advance of the attainment of a predetermined low temperature within the space being controlled in order to compensate for the inherent lag of the cooling and control system. In other words the heater anticipates the cooling effect produced by the cooling system before that cooling actually occurs within the space so that the temperature of the space may be maintained more nearly at the desired value and preventing over-run of the system.

During the heating season switch 37 may be closed and switch 36 may be open so that the controller 40 is in control only of the valve 31. If now the humidity of the space drops to a predetermined value, a need for further heating in the space is indicated, this drop in humidity causing arm 60 to be moved into engagement with contact 62 under the influence of humidity responsive element 50. Current through the solenoid 34 flows through the following circuit: from line 83 through conductor 90, arm 60, contact 62, conductors 100, 110, solenoid 34, conductor 111, switch 37 and conductor 112 to the line 84. Upon the opening of valve 34 steam flows through the coil 30 heating and humidifying the air within chamber 10 which air is circulated by the fan 13 to the space to be heated. Heater 85 is also energized at this time through the circuit previously described and bellows 80 will now be caused to expand under the influence of the heated 85 and the heat produced by the heating coil 30, the effect being to cause arm 71 to move upwardly over the heater 70 thus decreasing the heating effect thereof whereupon the humidity of the air affecting the humidity responsive device 50 is increased and after it has increased to a desired point arm 60 will be caused to move into engagement with contact 61. Heater 85 and solenoid 34 will both be deenergized at this time thus causing the bellows 80 to slowly contract, arm 71 to move downwardly and heater 70 to raise the temperature of the air flowing thereby. Therefore by reason of the deenergization of heater 85 and the drop in temperature of the coil 30 the temperature of the air affecting bellows 80 will decrease. The heat applied to humidity element 50 will increase, thereby causing a decrease in the humidity of the air flowing by said element with the result that arm 60 is again moved into engagement with contact 62. Heater 85 acts in the same way as during the cooling cycle of the system by anticipating the arrival of heat in the space being heated by coil 30 before this heat actually arrives in the space and is felt by the control, thus shutting off the system somewhat ahead of the time the desired conditions have been attained in the space and therefore preventing the temperature from over-running by reason of the lag in the system.

It will be noted that in both the heating and cooling cycles of the system, the humidity responsive element acts as a main controller but the control point thereof is varied in accordance with the temperature in the space being controlled so that by utilizing the combined effects of humidity and temperature, a substantially uniform effective temperature may be at all times maintained within the space regardless of the changes in the relative humidity thereof. Thus if the humidity of the space during the heating season decreases to a low value, a greater temperature rise is required in the space to cause bellows 80 to move arm 71 far enough to cause the humidity responsive element 50 to cause a shut-down of the heating system so that the temperature of the space is maintained at a higher value when the humidity in the space is low than is the case when the humidity in the space is relatively high. Likewise during the cooling season the temperature will be maintained at a lower value during high humidity conditions than is maintained during low humidity conditions.

While switches 36 and 37 have been shown to control the valve 31 and compressor motor 23 it is obvious both of these switches could be maintained closed at all times and magnets 63 and 64 spaced far enough apart to provide a rest period between the magnets in which the arm 61 is attracted equally by the magnets and is in engagement with neither contact, so that when arm 60 is in engagement with contact 61 the cooling system is placed in operation, when said arm is in engagement with neither contact 61 or 62, neither the cooling nor the heating system is in operation but when arm 61 moves into engagement with arm 62, the heating system is placed into operation. In this way an all year around system may be provided which will require no manual attention during different seasons of the year.

Figure 2:
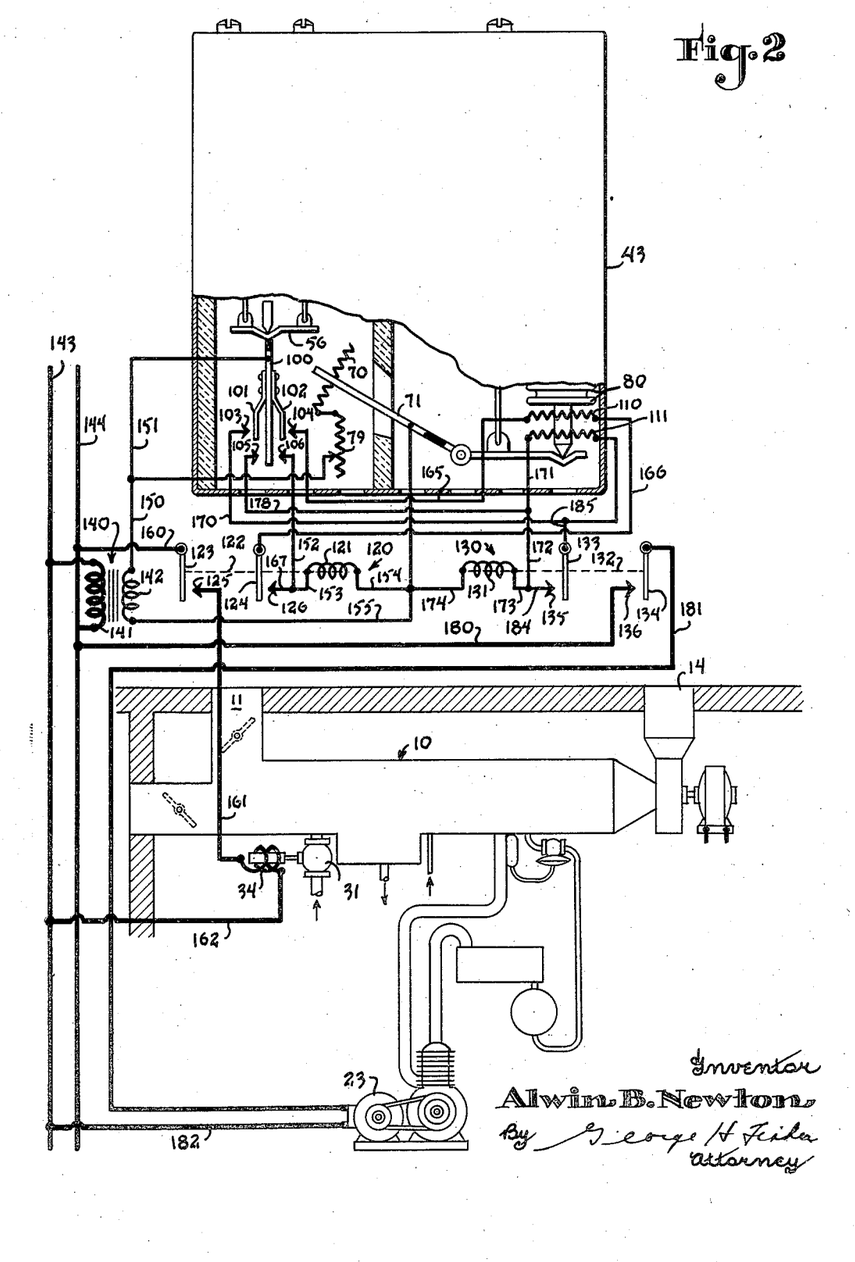
Figure 2 is another form of system embodying my invention.

Description of Figure 2

Referring now to the system illustrated in Figure 2 an air conditioning chamber 10 similar to that of Figure 1 and including heating and cooling apparatus like that of Figure 1 is provided. The control means for the heating and cooling apparatus is however different from that illustrated in Figure 1. A humidity responsive device similar to the device 50 of Figure 1 operates, through the lever 56, the arm 100 carrying flexible contact arms 101 and 102 cooperating with fixed contacts 103 and 104, respectively. Arm 100 is arranged to engage contact 105 and 106 depending upon the humidity existing within the chamber. When the humidity within the chamber drops to a low value the lever 56 is pivoted in a counter-clockwise direction and arm 102 engages contact 104. A further drop in humidity will cause the arm 102 to yield and permit the engagement of arm 100 with contact 106. Similarly upon a rise in relative humidity the arm 101 will first engage the contact 103 and then the arm 100 will engage contact 105.

Positioned below the thermostatic bellows 80 are two heating elements represented by the reference characters 110 and 111 which function to raise the temperature of the air surrounding the bellows 80 above the temperature within the space being heated or cooled when these heaters are energized.

Controlled by the humidity responsive device is a relay 120 which includes a relay coil 121, an armature 122, arms 123 and 124 operated by the armature 122 and cooperating with fixed contacts 125 and 126, respectively. A second relay 130 is also controlled by the humidity responsive device as will be hereinafter explained, this relay comprising a relay coil 131, an armature 132, contact arms 133 and 134 operated by the armature 132, and fixed contacts 135 and 136, respectively. Upon energization of either of the relays, the arms are moved into engagement with the respective contacts and when the relay coils are deenergized the arms move away from the respective contacts under the influence of any suitable biasing means (not shown) or by gravity.

For energizing the various heating elements and the relays a step-down transformer 140 which may include a high tension primary 141 and a low tension secondary 142 may be provided. Primary 141 is connected to line wires 143 and 144 connected to a suitable source of power (not shown).

Operation of Figure 2

In the operation of the system illustrated in Figure 2 a drop in relative humidity indicating a need for the supply of heat to the space being heated is accompanied by movement of the arm 102 of the humidity responsive device into engagement with the contact 104. The movement of arm 102 into engagement with contact 104 does not energize the relay 120 but when the humidity drops to a lower value and arm 100 engages the contact 106, relay coil 121 is energized through the following circuit: from low tension secondary 142 through conductors 150, 151, arm 100, contact 106, conductors 152, 153, relay coil 121, and conductors 154 and 155 to the other side of secondary 142. The energization of coil 121 causes the arms 123 and 124 to move into engagement with the fixed contacts 125 and 126, respectively. The movement of arm 123 into engagement with contact 125 causes the solenoid 34 for the valve 31 to be energized through the following circuit: From the line wire 144 through conductor 160, arm 123, contact 125, conductor 161, solenoid 34, and conductor 162 to the line wire 143. The energization of solenoid 34 permits the admission of heating fluid to the coil 30 as in Figure 1.

The movement of arm 124 into engagement with contact 126 closes a maintaining circuit through the relay coil 121, which circuit includes the heater 110 as follows: from the secondary 142 through conductors 150, 151, arms 100, 102, contact 104, conductor 165, heater 110, conductor 166, arm 124, contact 126, conductors 167, 153, the relay coil 121 and conductors 154 and 155 to the other side of the secondary 142. It should be noted that the above described maintaining circuit for the relay coil 121 is independent of the engagement of arm 100 with the contact 106 so that the relay coil 121 will remain energized until the arm 102 moves away from the contact 104. In this manner a suitable operating differential is provided whereby the heating means is started when the humidity affecting the humidity element drops to a low value and continues until this humidity rises to a somewhat higher value. The heating element 110 will not become appreciably warm at this time because the circuit through this heating element is in parallel with the original energizing circuit through the relay 121 which is of course of very much lower resistance. As soon as the humidity in the casing 43 has risen high enough to cause the arm 100 to move away from the contact 106 the only circuit through the relay coil 121 is through the heater 110 so that this heater will now begin to heat up the bellows 80.

As in Figure 1 the humidity responsive element is heated by the heater 70, the heating effect thereof being controlled by the bellows 80, expansion of this bellows causing arm 71 to move upwardly over the resistance 70 and decreasing the heating effect thereof. The energization of the heater 110 causes the bellows 80 to expand faster than if it were subjected only to the temperature of the space being heated so that the heating effect of the heater 70 now decreases more rapidly and the temperature of the air passing over the humidity device will decrease and the relative humidity will therefore increase and cause the arm 102 to move away from the contact 104 sooner than it otherwise would. In this manner the lag of the heating system and the lag in the responsiveness of the humidity and temperature responsive elements, is compensated for so that the danger of the temperature in the space rising to a higher value than is desired is reduced.

Assume now that the humidity in the space reaches an excessive value so that arm 101 engages contact 103. The following circuit is established through the heating element 111: from the secondary 142 through conductors 150, 151, arms 100, 101, contact 103, conductor 170, heater 111, conductors 171, 172, 173, relay coil 131, conductors 174 and 155 to the other side of secondary 142. The resistance value of resistance 111 is such that when current flows through this resistance and the relay coil 131 there is insufficient current to energize the relay 130. The energization of the heater 111 causes the temperature of the air passing over the bellows 80 to rapidly increase and lower the heating effect of the heater 70 on the humidity element so that the humidity of the air passing over the humidity responsive element will also rapidly increase to such a point that the arm 100 engages the contact 105. Current now flows through the relay coil 131 through the following circuit which is independent of the heating element 111, this circuit being as follows: from the secondary 142 through conductors 150, 151, arm 100, contact 105, conductors 178, 172, 173, coil 131, and conductors 174 and 155 to the other side of secondary 142. This circuit parallels the circuit above described through the heater 111 and relay coil 131 and the relay coil 131 now draws sufficient current to cause the same to become energized and the current through the heater 111 now drops to a low value and this heater begins to cool off. Energization of coil 131 causes arms 133 and 134 to move into engagement with contacts 135 and 136, respectively. Engagement of arm 134 with contact 136 causes the compressor motor 23 to be energized through the following circuit: from the line wire 144 through conductor 180, contact 136, arm 134, conductor 181, motor 23, and conductor 182 to the line wire 143. Operation of motor 23 causes operation of the refrigeration system and the evaporator coil in the chamber 10 drops in temperature thus effecting a reduction in temperature and also in humidity of the air in the space being conditioned.

Engagement of arm 133 with contact 135 causes the following maintaining circuit through the relay coil 131 to be established: from the secondary 142 through conductors 150, 151, arms 100, 101, contact 103, conductors 170, 185, arm 133, contact 135, conductors 184, 173, relay coil 131, and conductors 174 and 155 to the other side of the secondary 142. This maintaining circuit it may be noted is independent of the engagement of arm 100 with contact 105, and is also independent of the heater 111 so that the relay 130 remains energized until arm 101 moves out of engagement with the contact 103. Because of the drop in temperature of the heater 111 the temperature of the air passing over the bellows 80 now begins to drop faster than the temperature in the space being controlled, thus causing the arm 71 to move downwardly over the resistance 70 and increase the heating effect thereof so that the temperature of the air passing over the humidity responsive device increases and the humidity surrounding this device decreases at a faster rate than the humidity in the space being controlled. After the humidity of the air passing over this element drops to a low enough value, the arm 101 moves out of engagement with the contact 103, the relay 130 becomes deenergized and the compressor motor 23 stops.

It will therefore be seen that with this system the main control over the heating and cooling apparatus is by the humidity responsive device and heat is supplied to this device in accordance with the temperature surrounding the bellows 80 as in Figure 1. By reason of the heaters 110 and 111 the bellows 80 is caused to heat faster than the air in the space when the heat is being supplied thereto and is caused to cool off faster than the air in the space being controlled during the operation of the cooling system thus compensating for the inherent lag of the heating and cooling apparatus, of the temperature responsive device 80, and of the humidity responsive device. Also the necessity of providing manual switches for changing over from winter to summer operation is obviated and a very efficient year around effective temperature control system is accomplished.

It will also be noted that in Figure 1, the heater 85 is energized as soon as there is a call for heat in the space being heated, whereas in Figure 2, the heater 110 is not energized until contact 102 moves away from contact 104, or until the temperature in the space being heated approaches the desired value. Also, in Figure 2, the heater 111 is energized when the temperature in the space approaches such a high value that a necessity for cooling is indicated, whereas in Figure 1, the heater 85 is energized during the cooling cycle when arm 60 engages contact 62, or when the cooling apparatus stops. In other words, in Figure 2, the heaters are energized only after the temperature in the space has approached the values making energization of the heaters desirable, thus giving a different sequence of operation from that of Figure 1.

Figure 3:
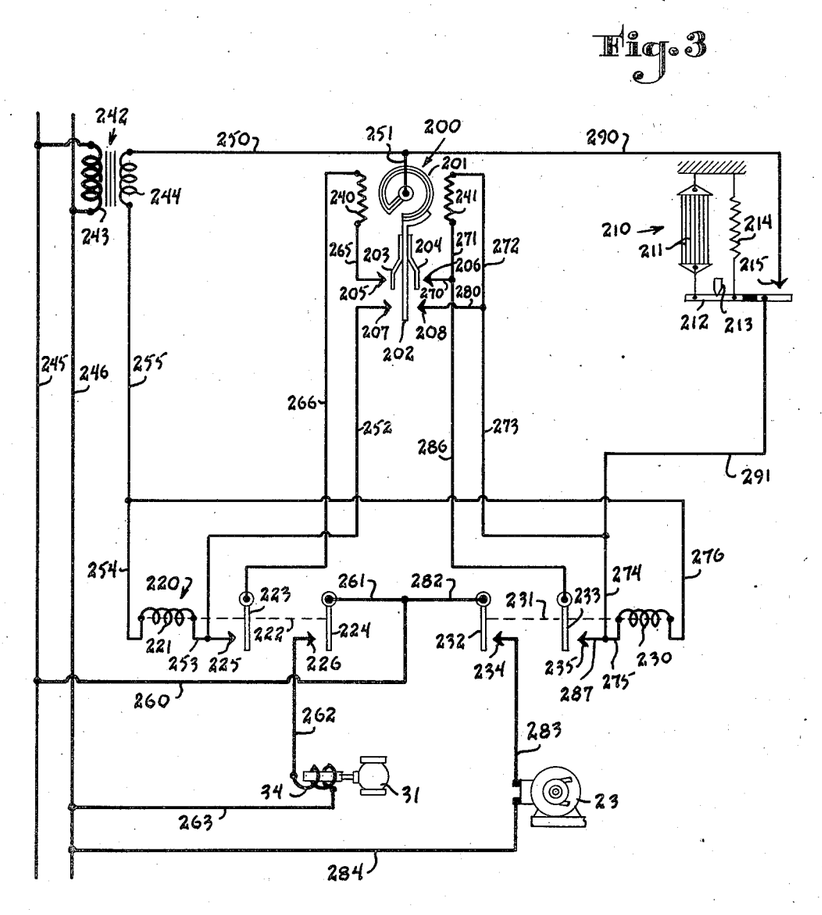
Figure 3 is a third system embodying my invention.

Description of Figure 3

Referring now to Figure 3 some of the principles of Figure 2 have been embodied therein. For simplicity's sake, the air conditioning chamber has not been illustrated in this figure but the compressor motor 23 for controlling the operation of a cooling system and a valve 31 for controlling the operation of a heating coil are provided as in Figures 1 and 2.

Mounted in the space being conditioned is a thermostat generally represented by the reference character 200. This thermostat may include a bimetallic element 201, an arm 202 carried thereby and resilient arms 203 and 204 carried by the arm 202. A fixed contact 205 is arranged to cooperate with the arm 203 and a second contact 206 is arranged to cooperate with the arm 204. Cooperating with the arm 202 are contacts 207 and 208. When the temperature in the space drops to a predetermined low value, the arm 203 engages the contact 205 and upon a further drop in the space temperature the arm 202 engages contact 207. Upon an increase in the space temperature to a predetermined value the arm 204 engages the contact 206 and upon further increase the arm 202 engages the contact 208. Also mounted within the space being controlled is a humidity responsive device 210 which may be of conventional construction and may include any suitable hygroscopic element 211 connected to an end of a lever 212 pivoted at 213, the right end of this lever being biased upwardly by means of a spring 214. The right end of this lever may be insulated from the remainder thereof and is arranged to engage a contact 215 when the humidity in the space reaches to a high enough value.

Controlled by the temperature and humidity responsive device is a relay 220 which includes a coil 221 armature 222 and arms 223 and 224 cooperating with fixed contacts 225 and 226, respectively. A second relay 230 similar to the relay 220 includes an armature 231, arms 232, 233 and contacts 234 and 235 cooperating with arms 232 and 233, respectively.

Mounted in heating relationship with the temperature responsive element 200 are heaters 240 and 241. For supplying power to the heaters and the relays a step-down transformer 242 which includes a primary 243 and a secondary 244 may be provided. Primary 243 is connected to line wires 245 and 246.

*Operation of Figure 3*

During the heating cycle, the sole control over the heating means is by the thermostat 200 but during the cooling season the compressor motor 23 may be controlled either by the thermostat 200 or the humidity responsive device 210.

Assuming now that the temperature in the space drops to a predetermined value, the arm 203 of thermostat 200 will engage contact 205 but this in itself produces no result. After the temperature in the space drops somewhat lower the arm 202 engages the contact 207 and the relay coil 221 is energized as follows: from the secondary 244 through conductors 250, 251, bimetallic element 201, arm 202, contact 207, conductors 252, 253, relay coil 221 and conductors 254 and 255 to the other side of secondary 244. The energization of coil 221 causes arm 224 to engage contact 226 and energize the solenoid 34 as follows: from line wire 245 through conductors 260, 261, arm 224, contact 226, conductor 262, solenoid 34, conductor 263 to the line wire 246. Engagement of arm 223 with contact 225 establishes the following maintaining circuit through the relay coil 221: from secondary 244 through conductors 250, 251, bimetallic element 201, arm 203, contact 205, conductor 265, heater 240, conductor 266, arm 223, contact 225, conductor 253, coil 221, and conductors 254 and 255 to the other side of secondary 244. This maintaining circuit does not include the contact 207 but does include the heater 240. This heater will not be heated to any appreciable extent however, until the circuit through the contact 207 is interrupted by a rise in the space temperature. As soon as the space temperature has risen sufficiently to cause the arm 202 to move away from contact 207 the only circuit through the coil 221 is through the heater 240 and this heater will quickly rise in temperature and raise the temperature of the air adjacent the thermostat 200 so that the arm 203 will move away from contact 205 sooner than if the thermostat were not heated by the heating element 240. In this way the lag in the heating system and in the responsiveness of the thermostat is compensated for and the danger of the temperature rising to a higher value than desired is reduced.

If the temperature in the space should reach a high enough value so that arm 204 engages contact 206, current will flow through the heater 241 as follows: from the secondary 244 through conductors 250, 251, bimetallic element 201, arm 204, contact 206, conductors 270, 271, heater 241, conductors 272, 273, 274, 275, relay coil 230, and conductors 276 and 255 to the secondary 244. This circuit will cause the heater 241 to increase the temperature but sufficient current will not pass therethrough to energize the relay 230. The energization of heater 241 will cause the temperature affecting the thermostat 200 to increase more rapidly until the arm 202 engages the contact 208 whereupon the following circuit through the relay coil 230 is established: from the secondary 244 through conductors 250, 251, bimetallic element 201, arm 202, contact 208, conductors 280, 273, 274, 275, coil 230, and conductors 276 and 255 to the other side of the secondary 244.

The energization of coil 230 causes arms 232 and 233 to move into engagement with contacts 234 and 235. The compressor motor 23 is now energized through the following circuit: from the line wire 245 to conductors 260, 282, arm 232, contact 234, conductors 283, motor 23, and conductor 284 to the line wire 246. The operation of motor 23 causes the air being supplied to the space to be cooled as in Figures 1 and 2. The following maintaining circuit for the relay 230 is established by the engagement of arm 233 with contact 235: from the secondary 244 to conductors 250, 251, bimetallic element 201, arm 204, contact 206, conductors 270, 286, arm 233, contact 235, conductors 287, 275, coil 230, and conductors 276 and 255 to the secondary 244. This maintaining circuit is independent of contact 208 and heater 241 so that the relay coil 230 will remain energized until the space temperature drops sufficiently so that arm 204 moves away from contact 206. Also the heater 241 is shunted out by the other circuits through the relay 230 and rapidly cools off so that the air adjacent the thermostat 200 will cool down at a faster rate than the air in the space and the arm 204 will move away from the contact 206 sooner than it otherwise would had the heater 241 not been previously energized thus anticipating the arrival of cold within the space.

Assume now that the temperature within the space is not sufficiently high to cause the operation of compressor motor 23 but the humidity within the space reaches an excessive value, making it desirable that the humidity within the space be reduced. The right end of arm 212 of the humidity responsive device 210 will be caused to move into engagement with the contact 215 and the relay 230 will be energized through the following circuit: from the secondary 244 through conductors 250, 290, contact 215, arm 212, conductors 291, 274, 275, relay coil 230 and conductors 276 and 255 to the other side of secondary 244. Energization of relay 230 causes the operation of the compressor motor 23 in the same manner as previously described so that the cooling apparatus is placed in operation and the humidity within the space begins to decrease. Operation of the cooling means of course causes dehumidification of the air within the space and after the humidity has dropped to a low enough value, the humidity controller causes deenergization of relay 230 providing the thermostat 200 is not calling for cooling, and the cooling system is accordingly shut down.

The dehumidification of the air may be attended by a substantial reduction in the temperature of the air so that thermostat 200 may call for operation of the heating apparatus in order to obtain reheat. The heating coil controlled by valve 31 may be placed downstream from the cooling coil controlled by compressor motor 23 in order to provide for reheat of the air whose temperature has been materially reduced to effect dehumidification thereof, and it is seen that the system of this figure provides for simultaneous operation of the heating and cooling means if conditions require it.

It will accordingly be seen that with the system shown in this figure a thermostat controls both the heating and cooling apparatus and means are provided to cause the thermostat to move in a direction to interrupt the operation of the heating and cooling apparatus at a faster rate than it would normally be caused to move solely because the change in the temperature of the air by reason of the operation of the heating or cooling apparatus. The cooling apparatus is also controlled by the humidity responsive device 210 so that two different controlling means are in effect provided for the cooling apparatus in this form of the invention.

Having described the preferred forms of my invention, many modifications may become apparent to those skilled in the art and I wish it to be understood that the invention is limited only by the scope of the appended claims.

I claim as my invention:

1. In a system of the class described, means for changing the temperature of a space, humidity responsive means in control of said temperature changing means, means locally affecting the relative humidity of the air adjacent said humidity responsive means, temperature responsive means in the space, means under the control of the temperature responsive means for varying the effect of the relative humidity affecting means, and means for causing movement of the temperature responsive means in the direction it is moved in response to operation of the temperature changing means at a rate faster than that at which it would normally be moved by operation of the temperature changing means.

2. In a system of the class described, a heating apparatus, a cooling apparatus, a humidity responsive device in control of the heating apparatus and the cooling apparatus, and movable into a first position to cause operation of the heating apparatus and into a second position to cause operation of the cooling apparatus, heating means in heating relationship with said humidity responsive means, temperature responsive means in the space being heated, means under the control of the temperature responsive means for varying the heating effect of the heating means to decrease the heating effect thereof as the temperature affecting the temperature responsive means increases, and means for causing movement of the temperature responsive means in the direction it is moved in response to operation of the heating or cooling apparatus at a rate faster than that at which it would normally be moved by reason of the change in spaced temperature by the heating or cooling apparatus.

3. An effective temperature control device comprising a humidity responsive device, control means operated thereby, heating means in heating relationship with said device, means responsive to the temperature of a space being controlled for varying the heating effect of the heating means, and means under the control of the humidity responsive means for locally heating said temperature responsive means.

4. In a system of the class described, a humidity responsive device, a condition changing means, means responsive to movement of said device to a predetermined position for causing operation of the condition changing means, means for varying the control point of said humidity responsive device, temperature responsive means controlling the operation of said last named means, heating means in heating relationship with said temperature responsive means, and means responsive to movement of the humidity responsive device to said predetermined position for energizing said heating means.

5. In a system of the class described, a humidity responsive device, a condition changing means, means responsive to movement of said device to a first position for causing operation of the condition changing means and to a second position for interrupting operation of the condition changing means, heating means in heating relationship with said humidity responsive device, temperature responsive means controlling the heating effect of said heating means, heating means in heating relationship with said temperature responsive means and means responsive to movement of the humidity responsive device away from said first position towards said second position for energizing said last named heating means.

6. In an effective temperature control system, means for cooling a space, humidity responsive means for causing operation of said cooling means in response to an increase in humidity in said space, heating means in heating relationship with said humidity responsive means, temperature responsive means in said space, means under the control of said temperature responsive means to vary the effect of said heating means on said humidity responsive means, and means for artificially heating said temperature responsive means to a point higher than that to which it would be heated by the air in said space during the time the cooling means is inoperative.

7. In an effective temperature control system, means for heating a space, humidity responsive means for causing operation of said heating means in response to a drop in humidity in said space, temperature responsive means in said space, means for heating said humidity responsive means, means for decreasing the heating effect of said heating means in accordance with a rise in temperature affecting said temperature responsive means, and means for artificially heating said temperature responsive means above the temperature of said space during the time that the heating means is in operation.

8. In a system of the class described, a temperature responsive device, a plurality of contacts moved thereby, a pair of fixed contacts sequentially engaged by the movable contacts in response to a fall in temperature of the air affecting said thermostat, a pair of fixed contacts sequentially engaged by the movable contacts in response to a fall in temperature of the air affecting thermostat, a pair of heaters in proximity to said thermostat and in heating relationship therewith, means for energizing one of said heaters upon disengagement of a movable contact with the last engaged of the first pair of fixed contacts after both of said first pair of fixed contacts have been engaged by the movable contacts and for deenergizing said heater upon disengagement of said fixed contact and the cooperating movable contact, and means for energizing said other heater upon engagement of the first engaged contact of said other pair of fixed contacts and the cooperating movable contact and for deenergizing said other heater upon engagement of the other of said other pair of fixed contacts and the cooperating movable contact.

9. In a system of the class described, a condition responsive device having a plurality of contacts moved thereby in response to a change in the condition to which said device responds, a plurality of fixed contacts cooperating with said movable contacts, the fixed contacts being so arranged with respect to the movable contacts that one pair of fixed contacts is sequentially engaged by a pair of movable contacts in response a decrease in value of said condition, a second pair of fixed contacts being sequentially engaged by a pair of movable contacts in response to an increase in value of said condition, a condition value increasing means operated in response to engagement of both of said first pair of fixed contacts and the cooperating movable contacts, means causing operation of said condition value increasing means until both of said first pair of fixed contacts have been separated from the cooperating movable contacts, a condition value decreasing means operated in response to engagement of both of said second pair of fixed contacts and the cooperating movable contacts, means causing operation of said condition value decreasing means until both of said second pair of fixed contacts have been separated from the cooperating movable contacts, condition value increasing means locally affecting said condition responsive device, means causing energization of said last named condition value increasing means in response to the disengagement of one of the movable contacts away from the last engaged contact of the first pair of fixed contacts and continuing energization thereof until the other fixed contact of said first pair of contacts has been disengaged by the cooperating movable contact, and means causing energization of said last named condition value increasing means in response to engagement of the first engaged contact of said second pair of fixed contacts by the cooperating movable contact and causing energization thereof until the other fixed contact of said second pair of contacts have been engaged by the cooperating movable contact.

10. An effective temperature control device comprising a humidity responsive element, a temperature responsive element, a housing surrounding said elements and comprising a partition wall dividing said housing into two chambers, each of said elements being in one of said chambers, openings in the upper and lower portions of said housing to provide for an upward circulation of air through said housing and past said elements, control means operated by said humidity responsive element in response to variations in humidity within said housing, a heater near the bottom of the chamber containing said humidity responsive element for creating an upward circulation of warm air over said humidity responsive element to modify the response of said element, and means controlled by said temperature responsive element in the adjacent chamber for controlling said heater.

11. An effective temperature control device comprising a humidity responsive element, a temperature responsive element, a housing surrounding said elements and comprising a partition wall dividing said housing into two chambers, each of said elements being in one of said chambers, openings in the upper and lower portions of said housing to provide for an upward circulation of air through said housing and past said elements, control means operated by said humidity responsive element in response to variations in humidity within said housing, an adjustable electric heater near the bottom of the chamber containing said humidity responsive element for creating an upward circulation of warm air over said humidity responsive element to modify the response of said element, and a member operatively connected to said temperature responsive element in the adjacent chamber and extending through an aperture in said partition wall for adjusting said heater.

12. In a condition control system, heating apparatus and cooling apparatus, temperature responsive means at all times in control of both the heating and cooling apparatus, said temperature responsive means being movable in response to changes in temperature in a space whose condition is being controlled to one position in which the heating apparatus is placed in operation and to a second position in which the cooling apparatus is placed in operation, and means effective in response to operation of the heating apparatus or the cooling apparatus by said temperature responsive means to cause the temperature responsive means to move out of either of said positions before such movement would occur solely as a result of the change in the space temperature caused by the heating apparatus or the cooling apparatus, said last named means comprising a pair of electric heaters which are normally both deenergized when said temperature responsive means is in an intermediate position between said two positions, one of said heaters being active incidental to said temperature responsive means assuming said one position and the other of said heaters being active incidental to the temperature responsive means assuming said other position.

13. In a condition control system, means responsive to a condition influencing the effective temperature of the air, means for increasing the value of said condition and means for decreasing the value of said condition, means placing both of said condition value changing means always under the control of the condition responsive means, said condition responsive means being movable in response to changes in the value of said condition and capable of remaining while said condition is relatively stable in either a first position in which the condition value increasing means is placed in operation, a second position in which the condition value decreasing means is placed in operation, or an intermediate position in which neither condition changing device is placed in operation, and means responsive to the operation of either of the condition value changing means by the condition responsive means to cause said condition responsive means to move to said intermediate position in which the condition value changing means being operated is placed out of operation before said movement would occur solely as a result of the change of the ambient value of the condition.

14. In a condition control system, heating apparatus and cooling apparatus, temperature responsive means at all times in control of both the heating and cooling apparatus, said temperature responsive means being movable in response to changes in temperature in a space whose condition is being controlled and capable of remaining while said temperature is relatively stable in either a first position in which the heating apparatus is placed in operation, a second position in which the cooling apparatus is placed in operation, or an intermediate position in which neither the heating nor cooling apparatus is placed in operation, and means effective in response to operation of the heating apparatus or the cooling apparatus by said temperature responsive means to cause the temperature responsive means to move out of either of said positions to said intermediate position before such movement would occur solely as a result of the change in the space temperature caused by the heating apparatus or the cooling apparatus.

15. In a temperature control system, heating apparatus and cooling apparatus, temperature responsive means in control of both of said apparatus at all times, means responsive to movement of the temperature responsive means to a first position to cause operation of the heating apparatus, means responsive to movement of the temperature responsive means to a second position to cause operation of the cooling apparatus, said temperature responsive means being capable of maintaining an intermediate position in which neither said heating nor said cooling apparatus s placed in operation, heating means adjacent the temperature responsive means, and means operative incidental to either said heating or cooling apparatus being placed in operation to change the effect of said local heating means to cause said temperature responsive means to move away from said first or second position to said intermediate position before such movement would occur solely as a result of the change in the ambient temperature caused by said heating or cooling apparatus.

ALWIN B. NEWTON.